W. THORNER.
OPTOMETER OF THE SCHEINER SYSTEM.
APPLICATION FILED MAR. 10, 1915.

Patented July 31, 1917.

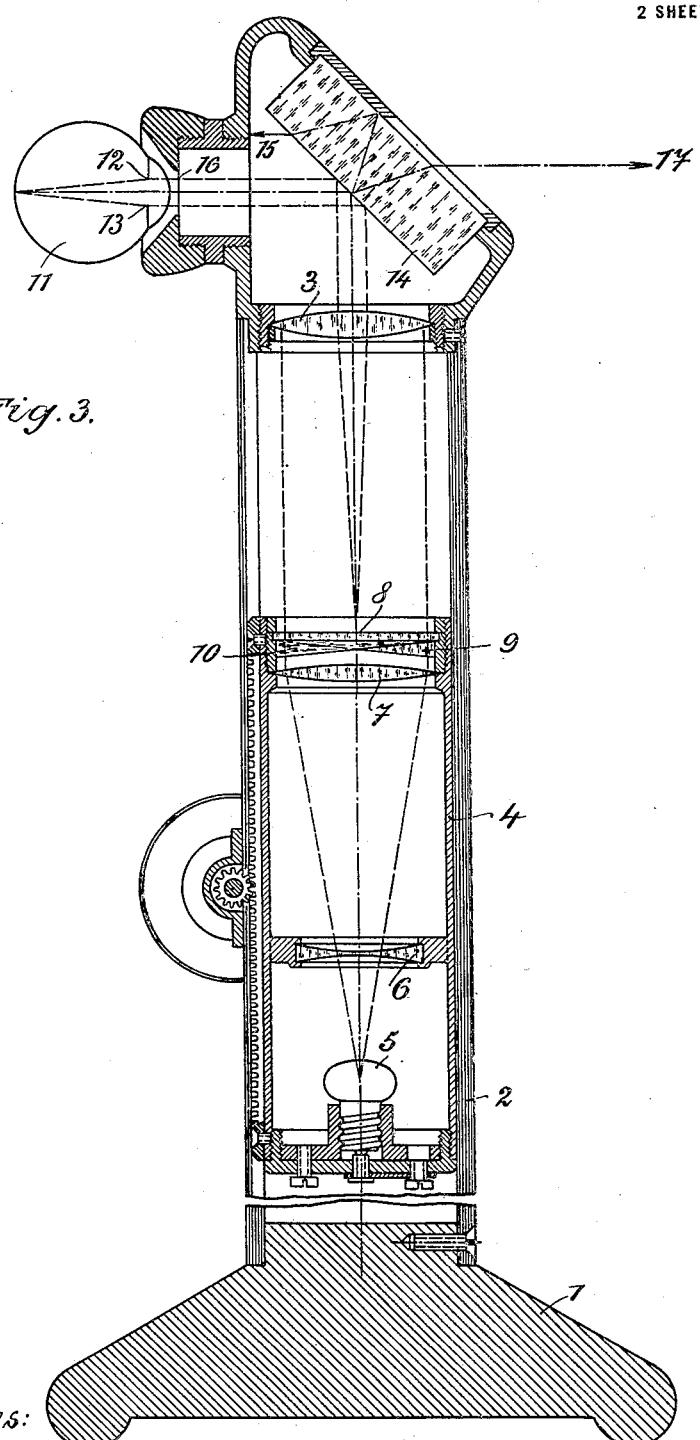

UNITED STATES PATENT OFFICE.

WALTHER THORNER, OF BERLIN, GERMANY.

OPTOMETER OF THE SCHEINER SYSTEM.

1,235,170.      Specification of Letters Patent.      Patented July 31, 1917.

Application filed March 10, 1915. Serial No. 13,475.

*To all whom it may concern:*

Be it known that I, WALTHER THORNER, a subject of the King of Prussia, residing at 19 Kleiststrasse, of Berlin, Germany, have invented certain new and useful Improvements in Optometers of the Scheiner System, of which the following is a specification.

My invention relates to optometers or instruments used in the art of ophthalmoscopy. In the optometers of the Scheiner system two narrow apertures are placed before the pupil of the eye and through these apertures a small object such as the point of a needle is viewed, this object appearing single only in the case where the eye is exactly adjusted upon it, while in all other cases it will appear double. Scheiner's optometers are little adapted for practical use for the reason that in order not to let the image appear too diffuse, the observation apertures have to be exceedingly narrow. Now it is very difficult indeed to make apertures which are sufficiently narrow, and such apertures will easily become stopped up and will darken the image to a great extent.

The present invention does away with this drawback by replacing the apertures to be placed before the eye by optically real images of such apertures. The real apertures must lie in a plane conjugated to the pupil and must be reproduced in the plane of the pupil by some optical means such as a convex lens. Such an arrangement offers the further advantage of allowing to transfer the real image of the two apertures into the plane of the pupil itself and to obtain thereby a greater range of view, while, if real apertures are used as is the case in Scheiner's device, these real apertures can be placed only outside the eye, the range of view being greatly narrowed in this case. Instead of producing in the pupil images of real apertures, it is simpler to use thread or point shaped sources of light and to project these sources of light within the plane of the pupil. In this case the thread shaped source of light itself replaces the aperture as no other light besides the light emitted by the thread shaped source of light can reach the eye and the same effect is obtained as if a slit was placed in the place of the thread shaped source of light.

The measuring of the ametropia by aid of this instrument is effected by displacing an object of fixation, preferably a narrow slit in the direction of the optical axis until the slit does not appear double any more but single. If it is desired to obtain the arrangement well known in optometers viz. that an equal displacement of the object of fixation corresponds to each dioptric ametropia, the pupil of the eye must be placed in the focus of that convex lens which serves for the observation of the object of fixation and at the same time for the reproduction of the sources of light within the pupil. In order to distinguish the double images, they may be illuminated in a well known manner with lights of different color.

The principle described above can be realized in a still simpler manner by employing only a single source of light. To this end the object of fixation is partly covered with a body deflecting the rays for instance with a prism, so that the rays passing through the uncovered part and the rays passing through the covered part of the object of fixation are directed to different parts of the pupil. Instead of leaving part of the object of fixation uncovered, different parts of it may be covered with deflecting bodies (prisms or the like) placed in such a manner as to deflect the rays to different sides of the pupil. In order to prevent the instrument from assuming an undue length, the source of light is preferably transferred by means of a telesystem into apparent infinity and this image lying in the infinite space is reproduced in the plane of the pupil by the convex lens serving for the observation of the object of fixation.

It is further advantageous to have a means for excluding the accommodation with certainty. This is obtained, if the observer looks upon objects placed afar and sees the object of fixation apparently projected upon these objects. In order to realize this the object of fixation is observed by reflection in a pane of glass while the observer is looking at objects placed afar through the same pane. The whole instrument is preferably arranged vertically. In order to avoid the pane of glass reflecting double images, it is advisable to employ a pane of a thickness which will cause the images of the object produced by its rear surface to fall entirely outside the aperture of observation.

If the source of light used is a thread shaped electric glow lamp, the object of fixation must consist of a slit parallel to the filament of the lamp as if placed at a right angle to the filament it would appear broadened. If a point shaped source of light is used, the object of fixation may have any shape, such as a cross or the like. In this latter case the instrument may also be employed for ascertaining astigmatism. For the line of the cross at right angles to the refracting edge of the prisms will appear single only in the principal meridians, whereas in all the other meridians it will appear refracted. Instead of employing a cross, a slit shaped object of fixation may be rotatably arranged.

In the drawings affixed to this specification the preferred form of my invention is represented.

Fig. 3 is a vertical section through an instrument constructed according to the present invention.

Figure 1:
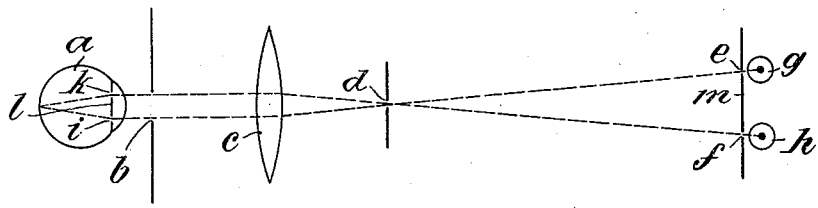
Figure 1 shows diagrammatically the path of the rays in the case of two separate sources of light being employed.

With reference to Fig. 1 $a$ is the eye, $b$ is the aperture, through which the eye is looking, $c$ is the convex lens reproducing the slit shaped object of fixation $d$. If $d$ is placed in the focus of $c$, then it is adjusted for an emmetropic eye, $e$ and $f$ are the two slit shaped diaphragms, $g$ and $h$ are the two thread shaped sources of light placed in front of said diaphragms. $i$ is the image of $e$ and $k$ is the image of $f$, both reproduced by $c$. The unilluminated part of the pupil $l$ corresponds to the optical image of the dark spot $m$ between the two diaphragms. The slit $d$ can be displaced in the direction of the optical axis on a scale graduated in dioptres.

Figure 2:
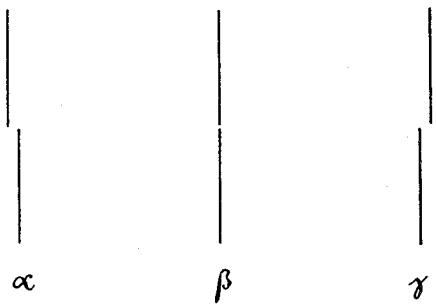
Fig. 2 shows the way in which the double images will be displaced on the object of fixation being displaced.

Fig. 2 shows the slit shaped object $d$ as it appears to the eye in different refractions in case that it is placed in the position of zero, that is in the plane of the rear focus. If the slit $e$ is covered with a red glass and the slit $f$ with a green glass, the part $k$ of the pupil contains the green image and the part $i$ the red image. Then an ametropic eye will see a red line and a green line. If the upper half of the slit $d$ is covered by a second green glass and the lower half by a second red glass then one half of the green and red lines will be seen as shown in Fig. 2. Then $\alpha$ shows the phenomenon in the case of hypermetropia, $\beta$ the one in the case of emmetropia and $\gamma$ the one in the case of myopia.

With reference to Fig. 3, 1 is the base of the optometer carrying the vertical tube 2. 3 is the convex lens fastened to the upper end of the tube. A sleeve 4 is displacedly arranged within tube 2. 5 is the point shaped source of light, 6 is a concave lens, 7 a convex lens. 8 is the object of fixation having a slit or any other suitable perforation and covered with two crossed prisms 9 and 10. The parts 5, 6, 7, 8, 9, and 10 are relatively stationary within sleeve 4. Sleeve 4 can be moved up and down within the tube 2 and can be turned around its longitudinal axis if it is desired to ascertain astigmatism. 11 is the observer's eye, 12 and 13 are the two real images of the source of light 5 reproduced in the pupil of entrance. 14 is the transparent pane of glass reflecting the rays entering the eye at its front surface. The rays reflected at the rear face of the pane take the course to the point 15 and therefore fall outside the aperture 7 while the observer is looking to 17 through the pane 14.

It will be seen that the two images of the source of light in the pupil of the patient's eye have the same effect and serve the purpose of the two slits in the card of the Scheiner experiment. The rays of light can only go through the pupil at those points at which the images of the source of light are located. The other portions of the pupil which remain dark act as a separating diaphragm. It is immaterial whether such separating diaphragm consists of a screen which absorbs the rays of light falling thereon or whether the rays of light are so directed inwardly from the front that they enter the eye only through two slits. This is accomplished by having the separating diaphragm in the neighborhood of the source of light 5 and by having it clearly pictured in the pupil of the patient's eye.

I claim:—

1. In an optometer of the Scheiner system, in combination, narrowly confined sources of light and means for reproducing images of said narrowly confined sources of light in the plane of the pupil of the eye.

2. In an optometer of the Scheiner system, in combination, narrow light bodies and means for reproducing images of said narrow light bodies in the plane of the pupil of the eye.

3. In an optometer of the Scheiner system, in combination, a narrowly confined source of light and means for reproducing two reduced images of said narrowly confined source of light in the plane of the pupil of the eye.

4. In an optometer of the Scheiner system, in combination, a narrow light body and means for reproducing two reduced images of said narrow light body in the plane of the pupil of the eye.

5. In an optometer of the Scheiner system, in combination, a narrowly confined source of light, means for reproducing reduced images of said source of light in the plane of the pupil, an object of fixation and means covering said object and adapted to deflect the rays of light emanating from said source of light to different parts of the pupil.

6. In an optometer of the Scheiner system, in combination, a narrowly confined source of light, means for reproducing reduced images of said source of light in the plane of the pupil, an object of fixation, a plurality of bodies covering said object and adapted to deflect the rays of light emanating from said source of light to different parts of the pupil, an optical tele-system for apparently reproducing said source of light in the infinity and means for displacing said tele-system, said object of fixation and said deflecting bodies all together relatively to the means of reproduction of the object of fixation.

7. In an optometer of the Scheiner system, in combination, a narrowly confined source of light, means for reproducing reduced images of said source of light in the plane of the pupil, an object of fixation, a plurality of bodies covering said object and adapted to deflect the rays of light emanating from said source of light to different parts of the pupil, an optical tele-system for apparently reproducing said source of light in the infinity, means for displacing said tele-system, said object of fixation and said deflecting bodies all together relatively to the means of reproduction of the object of fixation and a transparent mirror placed obliquely in the plane of intersection of the light rays and the pupil axis.

8. In an optometer of the Scheiner system, in combination, a vertically disposed tube, a sleeve within said tube, an electric glow lamp in the lower end of said sleeve, a point shaped filament in said lamp, a tele-system, a pair of crossed prisms and a diaphragm in said sleeve above said prisms, means for turning and vertically displacing said sleeve and the parts fixed in it within said tube, a convex lens in the upper end of said tube, a transparent mirror disposed at an angle of 45° above said convex lens and an aperture for observation above the lens and in the plane of intersection of the rays of light of the lamp and the transparent mirror.

In testimony whereof I affix my signature in presence of two witnesses.

Dr. WALTHER THORNER.

Witnesses:
HENRY HASPER,
WOLDEMAR HAUPT.